(12) United States Patent
Hofstetter et al.

(10) Patent No.: US 7,540,740 B2
(45) Date of Patent: Jun. 2, 2009

(54) HYDRAULIC SYSTEM FOR A SLIDE

(75) Inventors: Otto Hofstetter, Uznach (CH); Luis Fernandez, Uznach (CH)

(73) Assignee: Otto Hofstetter AG, Uznach (CH)

( * ) Notice: Subject to any disclaimer, the term of this patent is extended or adjusted under 35 U.S.C. 154(b) by 0 days.

(21) Appl. No.: 10/542,782

(22) PCT Filed: Feb. 2, 2004

(86) PCT No.: PCT/CH2004/000055

§ 371 (c)(1),
(2), (4) Date: Jul. 20, 2005

(87) PCT Pub. No.: WO2004/068927

PCT Pub. Date: Aug. 19, 2004

(65) Prior Publication Data

US 2006/0083810 A1      Apr. 20, 2006

(30) Foreign Application Priority Data

Feb. 3, 2003    (CH) ..................... 155/03

(51) Int. Cl.
*B29C 45/33* (2006.01)
*B29C 45/40* (2006.01)
(52) U.S. Cl. .................. 425/441; 425/547; 425/556
(58) Field of Classification Search ............ 425/533, 425/534, 547, 556, 441, 411, DIG. 5, DIG. 58, 425/451, 436 R, 436 RM
See application file for complete search history.

(56) References Cited

U.S. PATENT DOCUMENTS

| | | | | |
|---|---|---|---|---|
| 3,659,995 A * | 5/1972 | La Grutta | ............... | 425/533 |
| 3,685,943 A * | 8/1972 | Fischer | ............... | 425/533 |
| 3,817,678 A * | 6/1974 | Armour | ............... | 425/525 |
| 3,868,202 A * | 2/1975 | Valyi | ............... | 425/525 |
| 3,941,539 A * | 3/1976 | Saumsiegle et al. | ......... | 425/525 |
| 4,571,171 A * | 2/1986 | Blank et al. | ............... | 425/533 |
| 6,099,766 A * | 8/2000 | Aoki et al. | ............... | 264/39 |
| 6,398,537 B2* | 6/2002 | Matysek | ............... | 425/183 |
| 6,767,497 B2* | 7/2004 | Knepper et al. | ............. | 264/334 |

FOREIGN PATENT DOCUMENTS

DE       3619595 A1 * 12/1987
EP       0873840 A1 * 10/1998

* cited by examiner

*Primary Examiner*—Yogendra Gupta
*Assistant Examiner*—Emmanuel S Luk
(74) *Attorney, Agent, or Firm*—The Nath Law Group; Jerald L. Meyer; Sungyeop Chung

(57) ABSTRACT

The invention relates to a form tool for injection-molding molded articles (6), especially PET parisons. The form tool comprises a base plate (2) and a stripper plate (3) having a slide (4). A plurality of separable male mold cones (5, 5') is provided on the slide (4). For removing the parisons (6), the male mold cones (5, 5') are completely opened using a hydraulic drive (12) instead of an inclined drag element.

3 Claims, 1 Drawing Sheet

HYDRAULIC SYSTEM FOR A SLIDE

BACKGROUND

1. Field of the Invention

The present invention relates to a multipart male mold plate for a form tool for injection-molding of molded articles.

2. Description of Related Art

Such male mold plates are used in injection-molding form tools as disclosed for example in EP 0 647 514 and comprise a base plate and a stripper plate having a slide, wherein the slide supports a plurality of separate male mold cones. In opening such form tool the multipart male mold plate is retracted in order to expose or uncover the freshly injected molded blanks, in particular preforms, i.e. to pull them from the female mold or die. There is provided a removal device between the die and the male mold plates to extract the preforms, for example as described in EP 0 907 488. To remove the preforms, the stripper plate, which is provided with a slide, is separated from the base plate and the slide is guided along an inclined drag element. By this means the various male mold cones are opened and the preforms can be transferred to the removal device. For this, pressurised air is used, by means of which the preforms are ejected from the opened male mold cones. The length of the preforms, generally 8 to 12 cm, permits insertion of the preforms in the removal device before the various male mold cones are completely open. This ensures a secure transfer of the preforms from the male mold cones to the removal device.

However in removing particularly short preforms, i.e. preforms with a length of about 3 to 5 cm, the secure intake or capture of the preforms in the respective removal sleeves of the removal device is not ensured, because the removal sleeves of the removal device cannot be brought close enough to the external extremity of the preforms, or because the separable male mold cone has a relatively long opening distance, for example about 5 cm or more.

SUMMARY

It is therefore an object of the present invention to provide a device by means of which relatively short preforms can be removed in a secure manner.

This object is achieved according to the invention by means of a male mold plate whose slide is actuatable by means of a hydraulic drive.

With the male mold plate according to the invention, the freshly injected preforms are retained or held back until they reach a removal sleeve of the removal device and are safely guided therein. Only then are the male mold cones completely opened according to the invention with the aid of a hydraulic drive, instead of with an inclined drag element, and the preforms can be securely sucked into the removal sleeves. Obviously, the opening of the male mold cones is started as early as possible in order to keep the cycle time of the tool as short as possible.

The advantages of such a male mold plate are immediately apparent to the person skilled in the art and are to be seen in particular in the shortening of the opening distance necessary for opening the male mold cone. Other advantages are to be seen in that pressurised air previously used is no longer required for removing the preforms and, as a consequence, the contamination of the preforms caused by this pressurised air can be avoided.

Other advantageous embodiments of the present invention are disclosed by the features of the dependent claims.

In a first preferred embodiment the hydraulic drive is attached or secured to the slide and rests against the stripper plate. Obviously the hydraulic drive can be secured also to the stripper plate and the slide can be actuated from there.

In a preferred embodiment the hydraulic drive serves to completely open the male mold cones and there is provided a pull-back spring to again close the open male mold cones. Naturally the expert can open the male mold cones by means of a spring force and can close them by means of the hydraulic drive. Advantageously the inclined drag element is provided with a step or swell at a location between a separation position and an extraction position, which displaces the slide by a detachment stroke. By means of this detachment stroke of less than 1 mm the preform is simply detached from the respective male mold cone, to avoid that the preform remains stuck to one half of the male mold cones when these are opened.

BRIEF DESCRIPTION OF THE SEVERAL VIEWS OF THE DRAWINGS

In the following the invention is described in more detail by means of an exemplary embodiment and with the help of the Figures which show.

DETAILED DESCRIPTION

Figure 1:
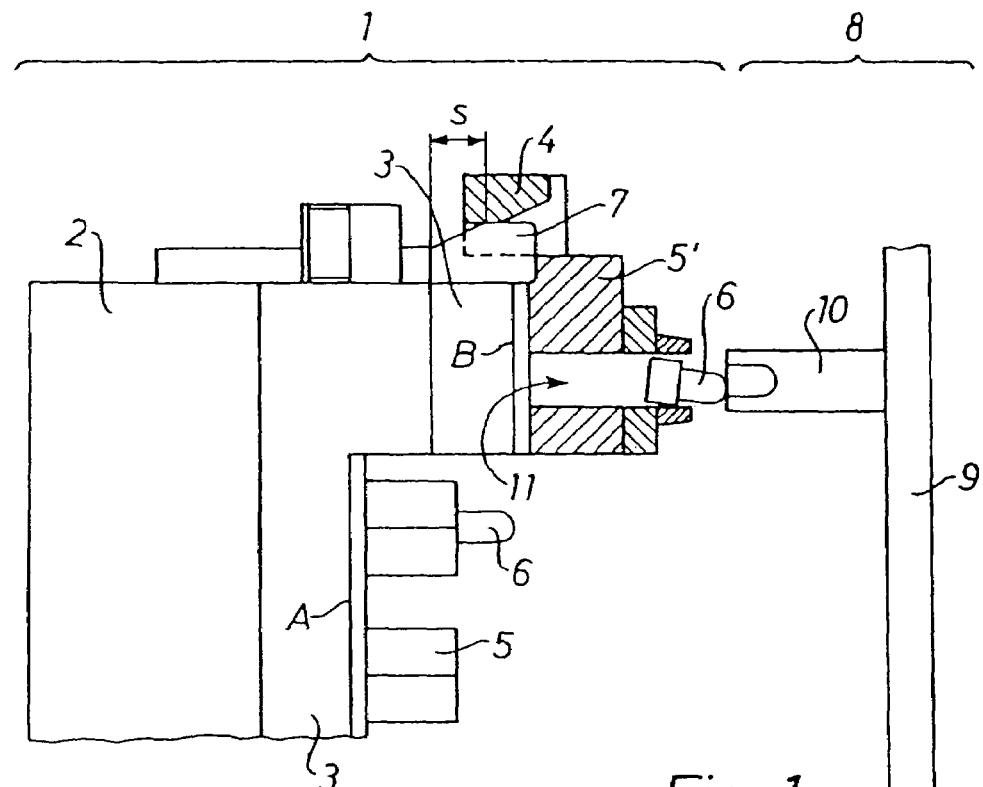
FIG. 1 a male mold plate of the known art in the extraction position.

FIG. 1 shows a multipart male mold plate 1 of a known type, which incorporates a base plate 2, a stripper plate 3 and a slide 4. This slide 4 bears several separable male mold cones 5, 5'. When opening the form tool the complete male mold plate is retracted for extracting the preforms 6 from the die (not shown) In a further cycle stage the stripper plate 3 is brought from a separation position A into an extraction position B. Thereby the slide 4 moves along an inclined drag element 7 which is securely attached to the base plate 2, which drag element 7 defines an opening distance s. This completely opens the male mold cones 5. The completely opened male mold cones are indicated by reference numeral 5'. FIG. 1 shows clearly that in opening the male mold cones 5, the individual preforms 6 are no longer securely held and in the extraction position B of the male mold cones 5' the preforms can cant and therefore can no longer be extracted. To effect the extraction of the preforms 6, pressurised air 11 is introduced into the open male mold cone 5' of this tool of the known art. This pressurised air generally carries dirt or oil particles and contaminates the freshly injected preforms. In addition, FIG. 1 shows clearly that the male mold cones 5' in the extraction position B and the removal device 8, respectively its removal plate 9 and removal sleeve 10, cannot be brought closer to each other, since in the case of a successful extraction of the preform, the latter would again be caught up by the closing male mold cone 5' during the retraction of the stripper plate 3 and would thus be pulled out from the removal sleeve 10.

Figure 2:
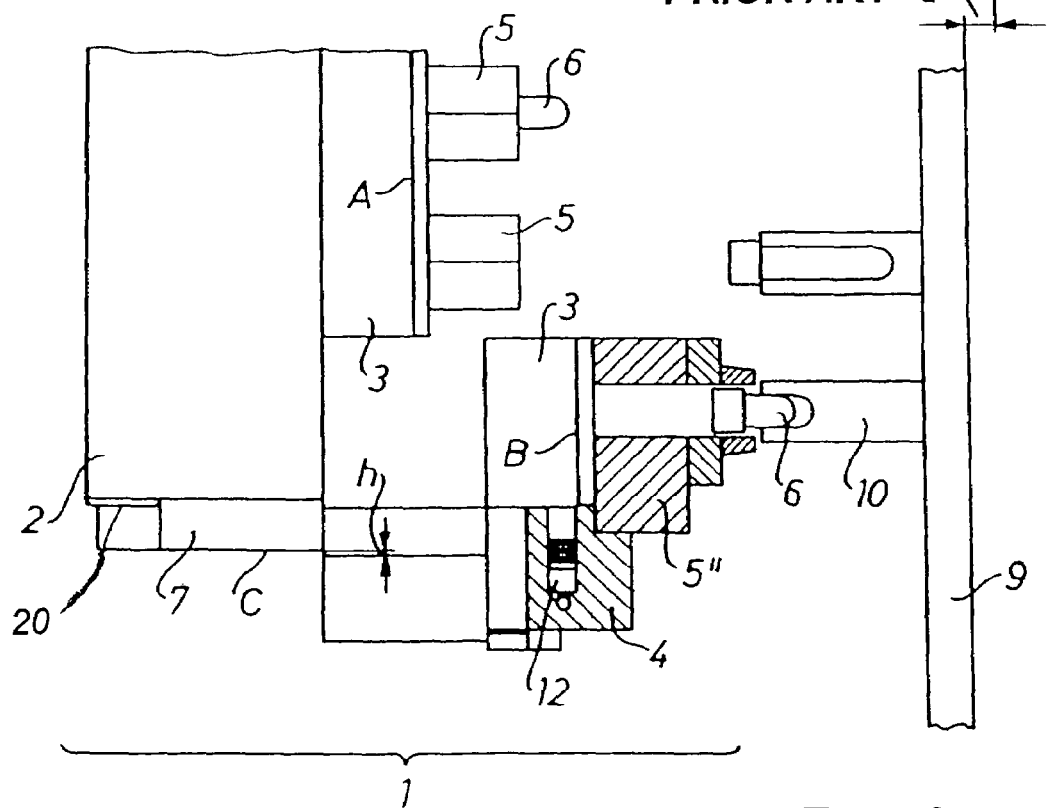
FIG. 2 a male mold plate according to the invention in the extraction position.

FIG. 2 shows an arrangement of the male mold plate 1 according to the invention, again with separable male mold cones 5 in their separation position A, as well as an opened male mold cone 5 in the extraction position B. The base plate 2 has a laterally arranged inclined drag element 7'which has only at position C a step or swell 20 to cause a detachment stroke h. By means of this detachment stroke h the preforms are merely loosened or detached from the male mold cones to ensure that the preforms, during the complete opening of the male mold cones 5, do not remain stuck to the latter. The slide 4 is movably attached to the stripper plate 3, which slide supports the separable male mold cones 5. In the zone of the extraction position B the male mold cone 5 is opened by means of a hydraulic drive 12. In this embodiment the hydraulic drive 12 is secured to the slide 4 and rests against the stripper plate 3.

FIG. 2 shows clearly that the opening distance s can be shortened significantly by using a hydraulic drive and thus the performs 6 can be brought into the extraction sleeves 10 of the extraction device 8, before the male mold cones 5 are completely open. Furthermore, this shorted opening distance allows to bring the extraction plate 9 of the extraction device 8, and the extraction sleeve 10, closer to the completely open male mold cones 5' by a distance d. This ensures a secure removal of extremely short preforms. Moreover it is possible to dispense with the use of pressurized air for the transfer of performs, thereby avoiding the associated contamination. Advantageously in a subsequent cycle stage, the male mold cones 5' are again brought into a closing position by means of a pull-back spring engaged at the slide 4.

The invention claimed is:

1. Multipart male mold plate (1) for a form tool for injection-molding of molded articles, in particular PET preforms (6), said male mold plate (1) comprising a base plate (2) and a stripper plate (3) having a slide (4), on which slide (4) there is provided a plurality of separable male mold cones (5, 5'), and there is provided at least one hydraulic drive (12) for completely opening the male mold cones (5, 5'), characterized in that the hydraulic drive (12) is secured to the slide (4) and rests against the stripper plate (3) and the male mold plate further characterized in that an inclined drag element provided with a step is secured to the base plate and actuates the slide in such a way that said drag element less than completely opens the male mold cones merely for a detachment stroke at a position between a closing position and an extraction position.

2. Male mold plate according to claim 1, characterized in that the hydraulic drive (12) cooperates with a pull-back spring.

3. Male mold plate according to claim 1, characterized in that the hydraulic drive (12) cooperates with a second hydraulic drive for opening the male mold cones (5, 5').

* * * * *